United States Patent
Ikai et al.

(10) Patent No.: US 7,365,931 B2
(45) Date of Patent: Apr. 29, 2008

(54) INFORMATION-RECORDING/REPRODUCING APPARATUS AND METHOD OF DETECTING THE GAP BETWEEN A HEAD AND A RECORDING MEDIUM

(75) Inventors: Yoshiaki Ikai, Kawasaki (JP); Atsuo Iida, Kawasaki (JP); Takahiro Imamura, Kawasaki (JP); Tohru Fujimaki, Kawasaki (JP); Toru Yokohata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/512,332

(22) Filed: Aug. 30, 2006

(65) Prior Publication Data

US 2007/0253092 A1    Nov. 1, 2007

(30) Foreign Application Priority Data

Apr. 28, 2006    (JP) ............................. 2006-125161

(51) Int. Cl.
*G11B 21/02*    (2006.01)
(52) U.S. Cl. ....................................................... 360/75
(58) Field of Classification Search .................... None
See application file for complete search history.

(56) References Cited

U.S. PATENT DOCUMENTS

2007/0070550 A1*   3/2007   Kurita et al. ............ 360/234.7

FOREIGN PATENT DOCUMENTS

JP          2003-308670         10/2003

* cited by examiner

*Primary Examiner*—Andrew L. Sniezek
(74) *Attorney, Agent, or Firm*—Kratz, Quintos & Hanson, LLP (57) ABSTRACT

A method of detecting a gap between a head and a recording medium in an information-recording/reproducing apparatus that uses the head to record and reproduce information in and from the recording medium. In the method, the gap between the head and the recording medium is alternately increased and decreased, thereby gradually reducing the gap between the head and the recording medium. A detection signal is detected from which to determine a contact between the head or a slider supporting the head and the recording medium. When it is determined that the head or the slider has contacted the recording medium, the head is stopped and moved away from the recording medium to a prescribed position, and data representing a distance the head has moved to contact the recoding medium is acquired.

20 Claims, 9 Drawing Sheets

☐ DEEP-GROOVE REGION
▨ SHALLOW-GROOVE REGION
▦ ABS REGION

PRIOR ART

INFORMATION-RECORDING/REPRODUCING APPARATUS AND METHOD OF DETECTING THE GAP BETWEEN A HEAD AND A RECORDING MEDIUM

BACKGROUND OF THE INVENTION

1. Field of the Invention

The present invention relates to an information-recording/reproducing apparatus that has a head for recording and reproducing information in and from a recording medium, and a method of detecting the position that the head has with respect to the recording medium in the direction of height.

2. Description of the Related Art

In information-recording/reproducing apparatuses, such as magnetic disk drives, the gap between the head and the recording medium should be as small as possible to meet the demand for high-density recording of information. If the gap is too small, however, the head may contact the recording medium and slide on the medium. If this happens, adverse events will occur, such as errors in recording and/or reproducing information due to the damage to the head and/or the medium, dust making due to the wear of the head and/or medium, and a so-called head crash due to the dust thus made. Thus, the gap between the head and the medium must be reduced, but not so much as to make the head contact the recording medium.

The head is held spaced from the recording medium by a slider that floats from the recording medium because of an air pressure. The distance by which the slider floats from the medium fluctuates in accordance with the process error of the slider, changes in the ambient temperature and changes in the air pressure in the apparatus. To reduce the fluctuation thereby to minimize the gap between the head and the medium, without causing the head to contact the medium, it is proposed that a small actuator utilizing thermal expansion or piezoelectric effect be mounted on the slider to achieve dynamic control of the distance between the head and the medium.

In order to drive the actuator thereby to move the head to an optimal position, the so-called zero-point detection (i.e., detection of the gap between the head and the medium) must be performed. This detection is accomplished by making the head contact the medium once, thereby to determine the position the head has at present. That is, it is determined the distance the actuator is moved until the head contacts the medium, decreasing the distance between the head and medium to zero. Using the point where the head contacts the medium as reference position, the head is then moved away from the medium by a predetermined distance. The head can therefore be held at an appropriate distance from the medium, without the necessity of information about the ambient temperature, the air pressure or the fluctuation of the floating distance of the slider. Here arises a problem with the use of the zero-point detection. Every time the zero-point detection is performed, the head contacts the medium. Consequently, such adverse events as mentioned above may occur in some cases.

To prevent the head from contacting the medium during the zero-point detection, a small AC vibration is applied to the actuator during the zero-point detection, thus shortening the time the head contacts the medium. This method mitigates the adverse events resulting from the head-medium contact. (See, for example, Patent Document 1: Jpn. Pat. Appln. Laid-Open Publication No. 2003-308670.)

In the method disclosed in Patent Document 1, however, the head continually contacts the medium many times, not only once. The repeated head-medium contact may sill result in such adverse events as mentioned above.

The actuator may utilize thermal expansion caused by a heater. In this case, a time lag develops during a period between the power-supplying to the heater and the start of the head moving, due to the thermal capacity of the materials of the components ambient to the heater. Inevitably, the head cannot be moved so fast as is described in Patent Document 1. The problem pointed out above cannot be solved.

Figure 13:
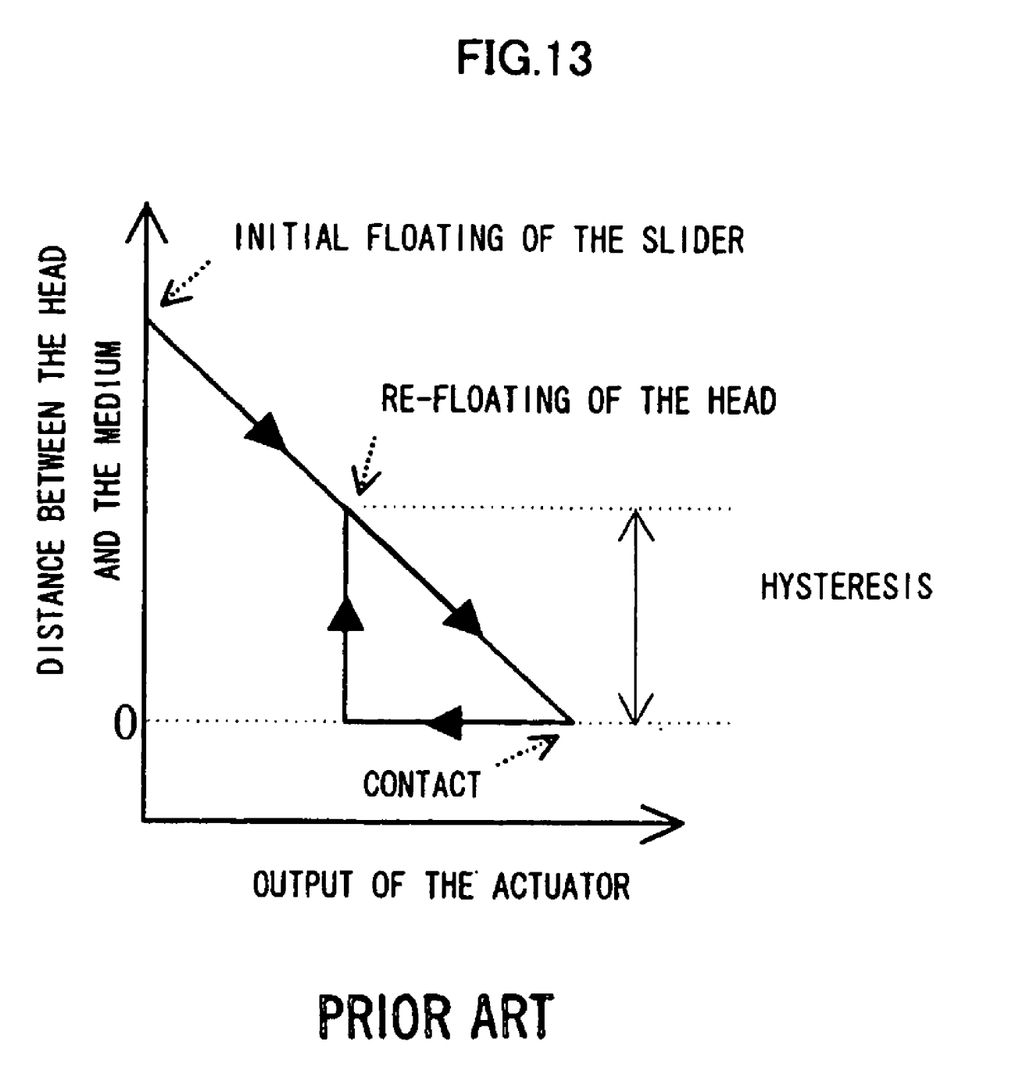
FIG. 13 is a diagram representing a behavior observed in a conventional information-recording/reproducing apparatus when the head contacts the recording medium.

As is generally known, such hysteresis as shown in FIG. 13 exists as a behavior that is observed when the head contacts the recording medium. That is, once the head contacts the medium as the actuator operates, the head cannot come out of contact with the medium even if it is tried to be moved back to the position it assumes immediately before it contacts the medium. Thus, the slider will not float again unless the head is moved back by a specific distance.

This hysteresis is generally too large to neglect, as compared with the distance the slider floats. If the actuator is operated to move back after the head-medium contact is detected, as is usually done to move the head away from the medium, the head will keep contacting the medium until the hysteresis ceases to exist, as is illustrated in FIG. 13. Inevitably, such adverse events as mentioned above may take place.

In some methods of detecting the head-medium contact, a great amount of data must be processed to determine whether the head has contacted the medium. It may take a long time to determine a head-medium contact in some cases. Then, the head remains in contact with the medium until it is determined that it indeed contacts the medium. In this case, too, such adverse events as mentioned above may take place.

SUMMARY OF THE INVENTION

The present invention has been made to solve the problem described above. An object of this invention is to provide an information-recording/reproducing apparatus and a zero-point detection method, in which the number of times the head contacts the medium and the time the head contacts the medium can be reduced as much as possible.

According to this invention, there is provided an information-recording/reproducing apparatus that uses a head to record and reproduce information in and from a recording medium. The apparatus comprises: a drive unit that alternately increases and decreases a gap between the head and the recording medium, thereby gradually reducing the gap between the head and the recording medium; a signal-detecting unit that detects a detection signal from which to determine a contact between the head or a slider supporting the head and the recording medium; and a control unit that moves the head to a prescribed position remote from the recoding medium and acquires data representing a distance the head has moved to contact the recoding medium, when it is determined, from the signal detected by the signal-detecting unit, that the head or the slider has contacted the recording medium.

In the information-recording/reproducing apparatus according to this invention, the drive unit drives the head to change cyclically the gap between the head and the recording medium, thereby to reduce the gap between the head and the recording medium during each cycle, and the control unit determines, from the signal detected by the signal-detecting unit, that the head or the slider has contacted the recording medium during each cycle.

In the information-recording/reproducing apparatus according to the invention, a minimum gap that exists between the head and the recording medium while the drive unit is alternately increasing and decreasing the gap is maintained all the time the control unit is able to acquire, from the signal-detecting unit, the signal from which to determine a contact between the head or a slider supporting the head and the recording medium.

In the information-recording/reproducing apparatus according to this invention, the control unit determines that the head has contacted the recording medium, after the head has been moved from the recording medium, from the signal that the signal-detecting unit detects.

In the information-recording/reproducing apparatus according to the invention, the drive unit comprises a heater that causes thermal expansion to drive the head.

In the information-recording/reproducing apparatus according to the invention, the drive unit drives the head to maintain a constant maximum gap between the head and the recording medium, while alternately increasing and decreasing the gap between the head and the recording medium, thereby gradually reducing the gap between the head and the recording medium.

In the information-recording/reproducing apparatus according to this invention, the drive unit drives the head away from the recording medium by a constant distance, while alternately increasing and decreasing the gap between the head and the recording medium, thereby gradually reducing the gap between the head and the recording medium.

In the information-recording/reproducing apparatus according to the invention, the signal-detecting unit detects, as a detection signal, a reproduced signal that the head has acquired from the recording medium, and the control unit determines, from the detection signal, that the head has contacted the recording medium.

In the information-recording/reproducing apparatus according to the invention, the signal-detecting unit detects, as a detection signal, a vibration signal representing vibration of the slider supporting the head, and the control unit determines, from the vibration signal, that the head has contacted the recording medium.

In the information-recording/reproducing apparatus according to the invention, the signal-detecting unit comprises a piezoelectric element that detects the vibration of the slider supporting the head.

In the information-recording/reproducing apparatus according to the invention, the signal-detecting unit comprises a piezoelectric element that detects vibration of a head arm that holds the head slider assembly comprises a head, a slider, and a suspension.

According to the present invention, there is provided a method of detecting a gap between a head and a recording medium in an information-recording/reproducing apparatus that uses the head to record and reproduce information in and from the recording medium. The method comprises: a driving step that alternately increases and decreases the gap between the head and the recording medium, thereby gradually reducing the gap between the head and the recording medium; a detecting step that detects a detection signal from which to determine a contact between the head or a slider supporting the head and the recording medium; and a controlling step that moves the head to a prescribed position remote from the recoding medium and acquires data representing a distance the head has moved to contact the recoding medium, when it is determined, from the signal detected by the signal-detecting unit, that the head or the slider has contacted the recording medium.

In the embodiments of this invention, the head is periodically moved up and down in order to perform zero-point detection. The gap between the head and the medium is gradually decreased, cycle by cycle. The moment the head is detected to contact the medium, the head is stopped, the head is moved to a position more remote from the position where it has contacted the medium.

The signal that drives the head up and down has such a waveform that the head remain contacting the medium for a minimum time required to detect the head-medium contact.

The head is periodically moved up and down for time Tc that is required to detect the head-medium contact, to approach the medium, cycle by cycle. In each cycle, it is determined whether the head has contacted the medium.

The actuator may be one utilizing thermal expansion and its response to an input signal delays too much to neglect, and the position where the head contacts the medium may differ from the position where it floats again, due to hysteresis. In this case, the signal to be input to the actuator is generated on the basis of the delay of the response and the hysteresis. The time the head keep contacting the medium during one cycle is reduced to time Tc required to detect the head-medium contact.

It may take a long time to detect the head-medium contact, because, for example, much information must be processed. In this case, too, the periodic signal input to the actuator is adjusted to make the head contact the medium long enough to acquire data from which the contact can be determined, and the head is kept away from the medium until it is determined whether the head contacted the medium.

The present invention can minimize the number of times the head contacts the medium and the time the head remains contacting the medium. Troubles, if any resulting from the head-medium contact, can therefore be minimized.

DETAILED DESCRIPTION OF THE PREFERRED EMBODIMENTS

Magnetic disk drives, or information-recording/reproducing apparatuses which are embodiments of the present invention, will be described, with reference to the accompanying drawings.

First Embodiment

Figure 1:
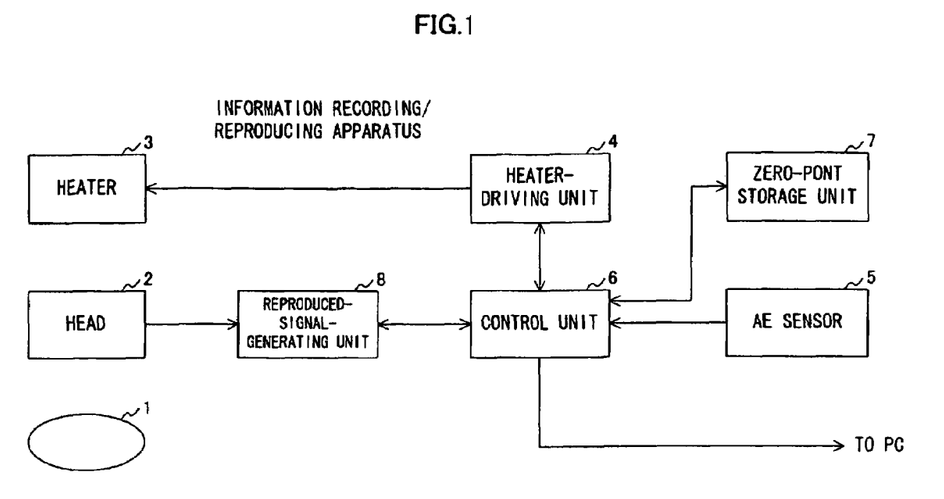
FIG. 1 is a block diagram showing the first embodiment of the present invention.
Figure 2:
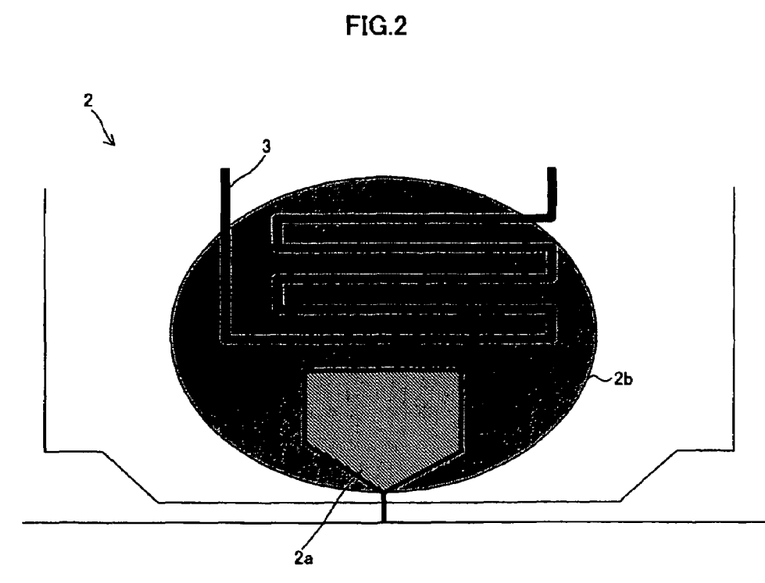
FIG. 2 is a diagram schematically depicting the head unit of the first embodiment.
Figure 3:
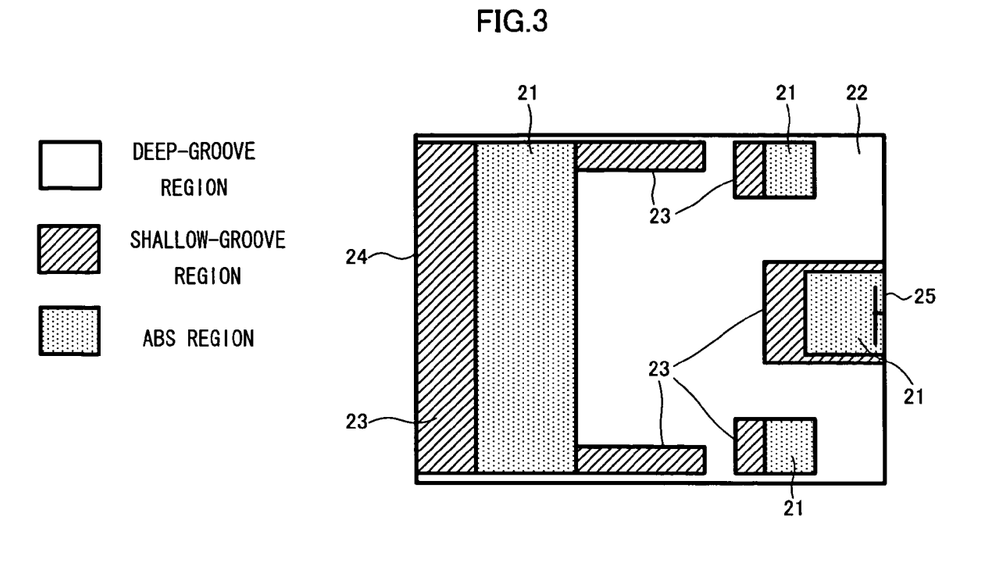
FIG. 3 is a diagram illustrating the air-bearing surface of a slider supporting a head.
Figure 4:
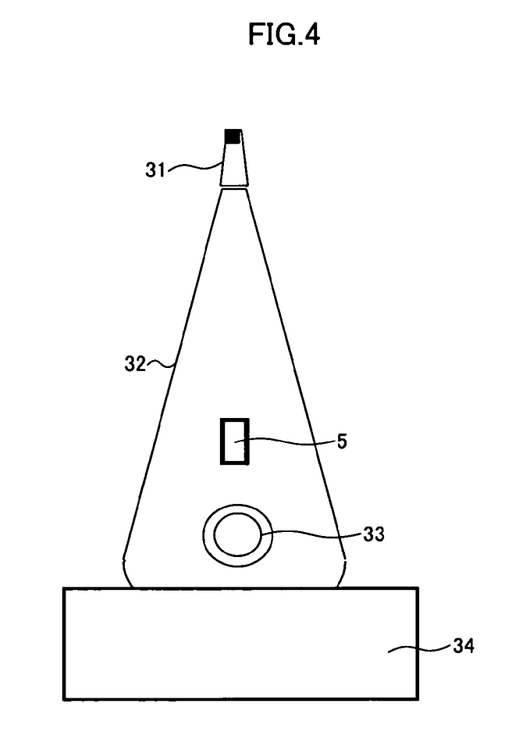
FIG. 4 is a plan view showing the head arm that supports the head slider assembly.

FIG. 1 is a block diagram showing a first embodiment of the present invention. FIG. 2 is a diagram schematically depicting the head unit used in the first embodiment. FIG. 3 is a diagram illustrating the air-bearing surface of a slider that supports the head in the first embodiment. FIG. 4 is a diagram showing the head arm that supports the head slider assembly comprises a head 2, a slider, and a suspension.

The magnetic disk drive according to the first embodiment comprises a write head, a read head, a heater 3, a heater-driving unit 4, an AE sensor 5, a control unit 6, and a zero-point storage unit 7. The write head writes information on a magnetic disk 1, i.e., recording medium. The read head reads the information from the magnetic disk 1. (Hereinafter, the two heads shall be called "head 2.") The heater 3 heats the holder holding the head 2, causing the head 2 to protrude toward the recording medium. The heater-driving unit 4 drives the heater 3 (causing the heater 3 to generate heat). The AE sensor 5 detects the vibration of a head arm. The control unit 6 keeps monitoring a vibration signal supplied from the AE sensor 5, controls the heater-driving unit 4 in accordance with the vibration signal, causing the unit 4 to drive the heater 3. Upon detecting from the vibration signal that the head 2 has contacted the magnetic disk 1, the control unit 6 acquires a zero-point (contact position), i.e., the distance the head 2 moves as the heater-driving unit 4 drives the heater 3. The zero-point storage unit 7 stores the zero-point that the control unit 6 has acquired.

The control unit 6 acquires a signal from the head 2 through a reproduced-signal-generating unit 8 that has, for example, a preamplifier. The control unit 6 decodes the signal into a reproduced-information signal, which is transmitted to a personal computer (PC) (not shown). The control unit 6 receives a write signal from the PC and supplies the same to the head 2 through a write-signal-generating unit (not shown). The head 2 records on the magnetic disc the information represented by the write signal.

As shown in FIG. 2, the head 2 has a write magnetic pole (i.e., write head) 2a and a head-holding part 2b that holds the write head 2a. The head-holding part 2b is heated by the heater 3 and is thermally expanded. Thermally expanded, the heat-holding part 2b moves the write head 2a toward the magnetic disk 1. The head 2 shown in FIG. 2 is a write head. Although not shown, the head unit has a read head, which may have the same configuration as the write head.

As shown in FIG. 3, the air-bearing surface of the slider has air-bearing regions 21, a deep-groove region 22, and shallow-groove regions 23. The shallow-groove regions are provided near the air-bearing regions 21. Air flows from the upstream side 24 of the air-bearing surface to the downstream side 25 thereof, causing the head 2 to float. The head 2 is located near the downstream side 25 of the air-bearing surface.

As FIG. 4 shows, the slider unit 31 is attached to the distal end of the head arm 32. The AE sensor 5, which will be described later, is mounted on the head arm 32 and positioned near the proximal part thereof. A head-arm axle 33 and a head-arm motor 34 are provided at the proximal part of the head arm 32.

Figure 5:
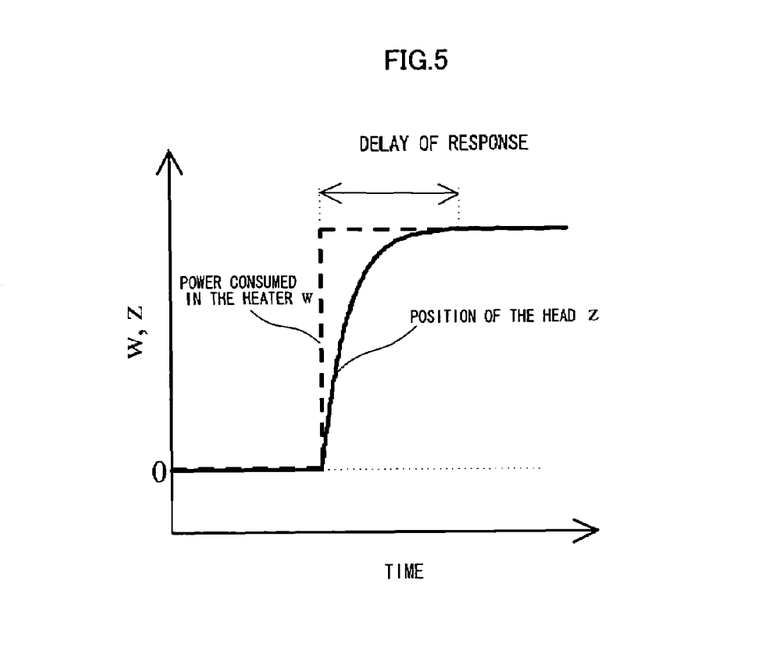
FIG. 5 is a diagram representing the response of the head.

When the heater 3 shown in FIG. 2 is energized, the power w consumed by the heater, i.e., the input, and the head position z, i.e., the output, delay by a time constant attributable to the thermal capacity of the materials of the components ambient to the heater 3. Assume that the output characteristic of the actuator is given by the following linear differential equation (1). Then, the difference between w and z can be illustrated in FIG. 5.

$$Ldz(t)/dt+Rz(t)=w(t) \qquad (1)$$

where w is the power consumed by the heater, z is the position of the head, and L and R are constants specific to the heater (actuator).

Figure 6:
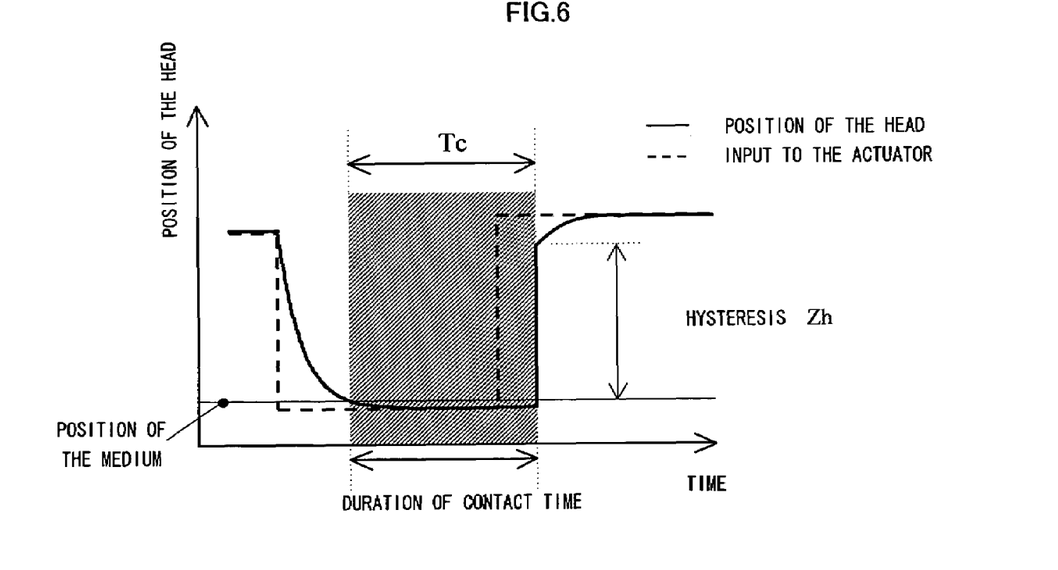
FIG. 6 is a diagram showing the hysteresis observed in the motion of the head.

FIG. 6 is a timing chart that shows the actual motion of the head. In FIG. 6, Tc is the time the head remains contacting the medium (i.e., time required to detect the head-medium contact), and Zh is the hysteresis, i.e., the difference between the position where the head contacts the medium and the position where the slider floats.

Figure 7:
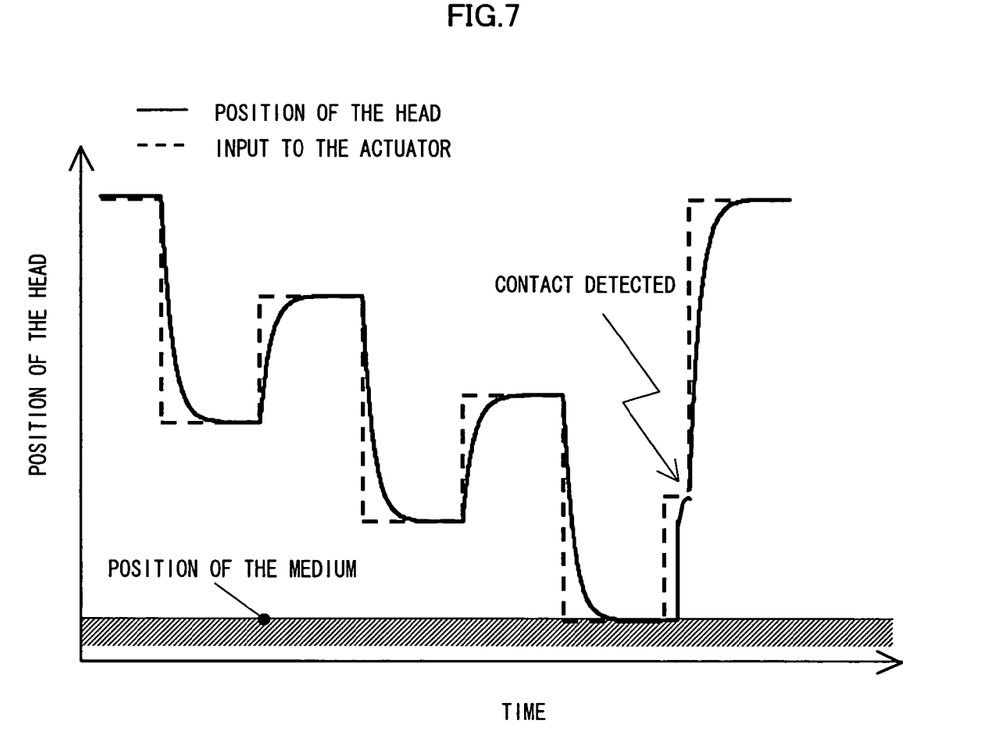
FIG. 7 is a diagram showing how the head is moved in the first embodiment.

In the present embodiment, the input waveform (i.e., broken line in FIG. 6) for one cycle is predetermined from the delay of the head position based on the equation (1) and the hysteresis Zh, so that the time between the time the head sufficiently approaches the medium (called contact time) and the time the head is farther than Zh from the medium (time to form a minimum gap) may be Tc. The data representing this waveform is periodically input to the actuator as illustrated in FIG. 7. The output is gradually increased, cycle by cycle, thereby moving the head toward the medium. In each cycle, it is detected whether the head has contacted the medium.

Figure 8A:
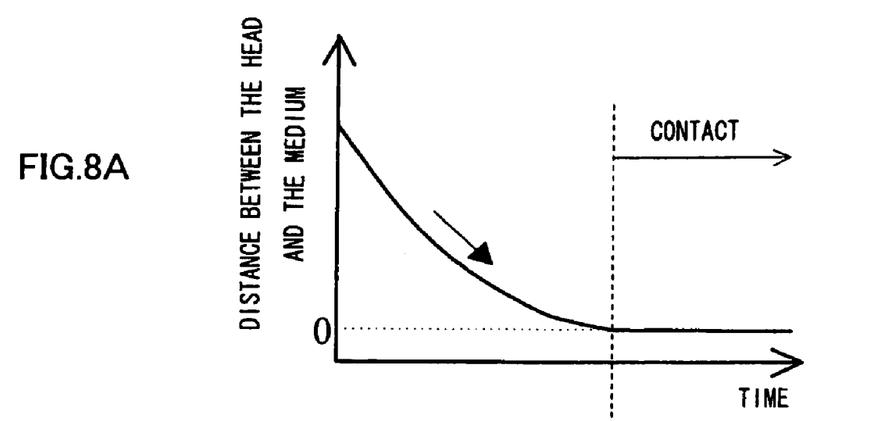
FIG. 8A is a diagram showing how the position of the head changes.
Figure 8B:
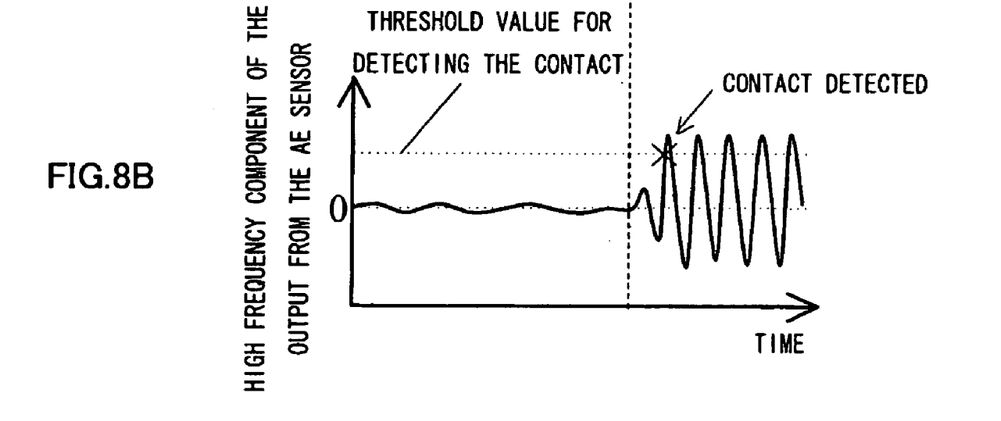
FIG. 8B is a diagram showing how the output of an AE sensor changes.

In the first embodiment, the AE sensor 5 is used as means for detecting whether the head has contacted the medium. As shown in FIG. 4, the AE sensor 5 is a piezoelectric element attached to the head arm 32 that holds the head slider assembly. When the head 2 contacts the disk 1, the slider vibrates due to the friction between the disk 1 and the head 2. The vibration is transmitted to the head arm 32. As a result, the high-frequency component of the output of the AE sensor 5 increases as shown in FIGS. 8A and 8B. When the output exceeds a preset threshold value, the control unit 6 determines that the head 2 has contacted the disk 1.

When the head-medium contact is detected, the control unit 6 stops inputting the waveform for one cycle and stored the data representing the zero-point position (i.e., amount of heat applied by the heater) in the zero-point storage unit 7. The zero-point can therefore be detected if the head contacts the medium only once for the minimum time Tc. Subsequently, the control unit 6 uses the zero-point position stored in the zero-point storage unit 7 and controls the heater-driving unit 4. Thus controlled, the unit 4 drives the heater 3, which moves the head 2 at an optimal position with respect to the magnetic disk 1.

In the first embodiment, the contact-detecting means used is a piezoelectric element that detects the vibration of the slider or the vibration of the head arm holding either the head slider assembly. Thus, the head-medium contact can be detected even if the contact lasts for an extremely short time.

Second Embodiment

Figure 9:
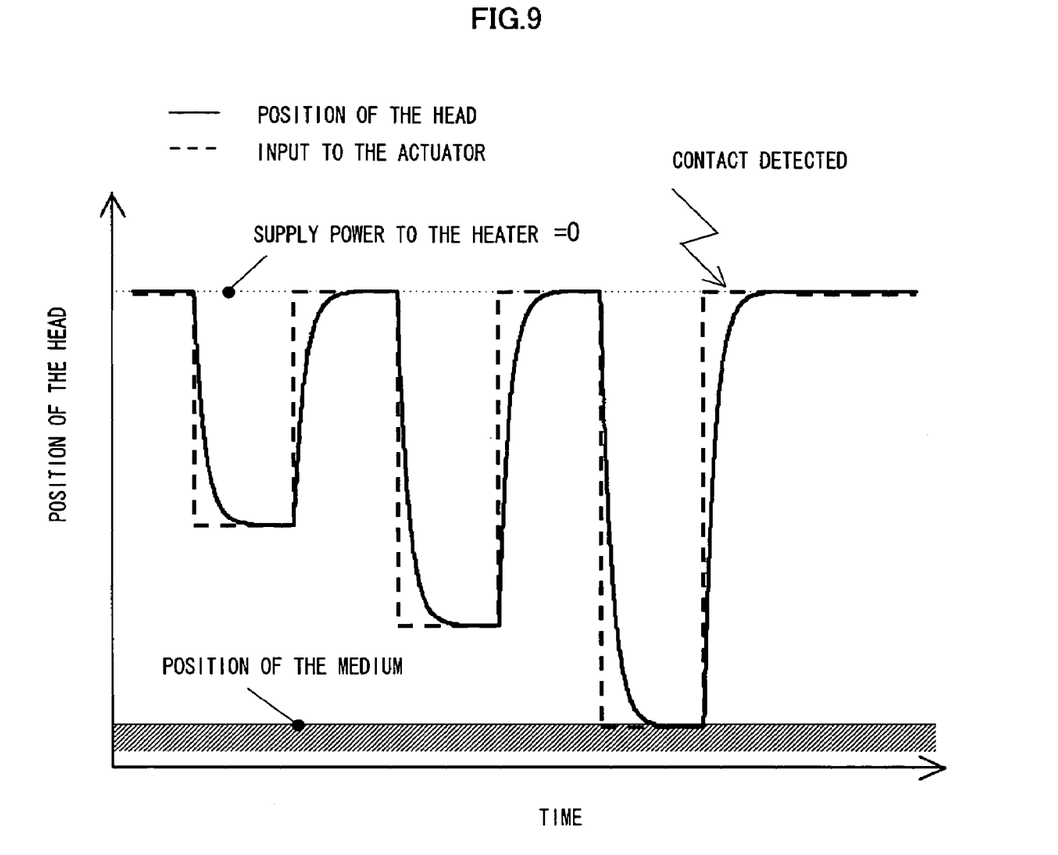
FIG. 9 is a diagram showing how the head is moved in the second embodiment of the invention.

FIG. 9 is a diagram showing a waveform of a drive signal that characterizes a second embodiment of the invention. In this embodiment, the control unit 6 controls the heater-driving unit 4, causing the unit 4 to set the zero-point detection input so that no power may be supplied to the heater at one-cycle intervals.

Figure 10:
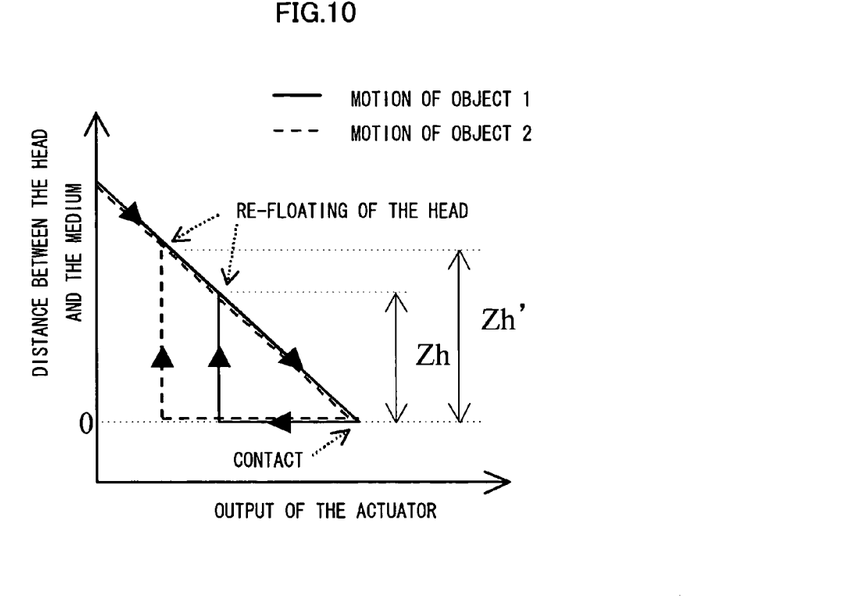
FIG. 10 is a diagram illustrating the fluctuation of the hysteresis.

Assume that the output characteristic of the heater (actuator) is defined by such a linear differential equation as the equation (1) given above. Then, the position of the head changes as indicated by the solid line in FIG. 9. As shown in FIG. 10, the heater (actuator) operates fast by the one-cycle drive input can be greatly varied even if the hysteresis changes because of the specific characteristic of the medium or slider used, as seen from hysteresis Zh and hysteresis Zh' shown in FIG. 10. The increase of the contact time due to the hysteresis can therefore be minimized.

In the second embodiment, the heater-driving unit 4 drives the heater 3 such that the head 2 is moved so that the maximum gap between it and the magnetic disk 1 may become constant.

Third Embodiment

Figure 11:
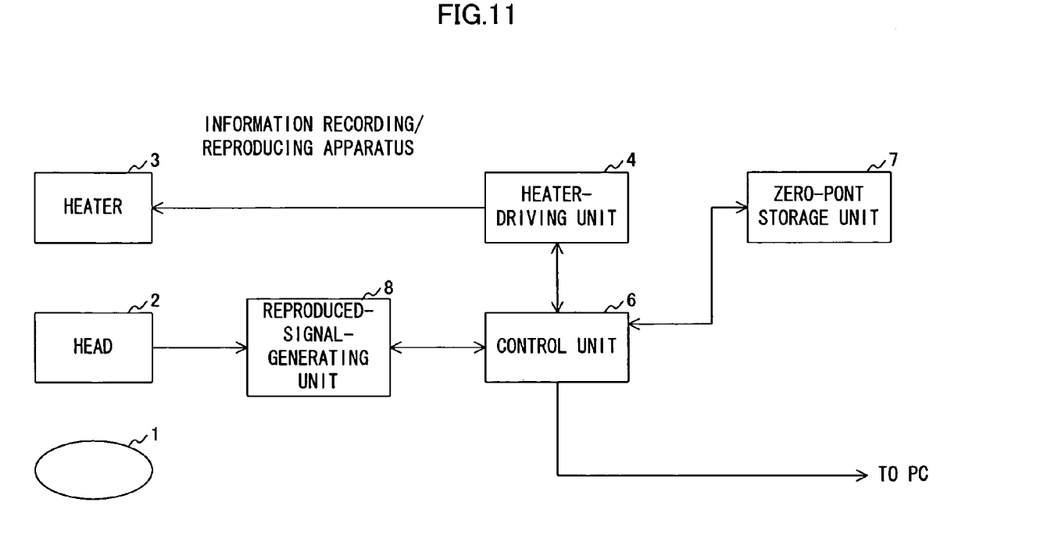
FIG. 11 is a block diagram showing the third embodiment of the present invention.

FIG. 11 is a block diagram showing a third embodiment of the present invention. The third embodiment is different from the first embodiment in that the reproduced-signal-generating unit 8 detects the head-medium contact, in place of the AE sensor 5 used in Embodiment 1. Note that the reproduced-signal-generating unit 8 receives a read signal from the head 2 and generates a reproduced signal from the write signal. Hence, the AE sensor 5 can be dispensed with in the third embodiment.

Figure 12A:
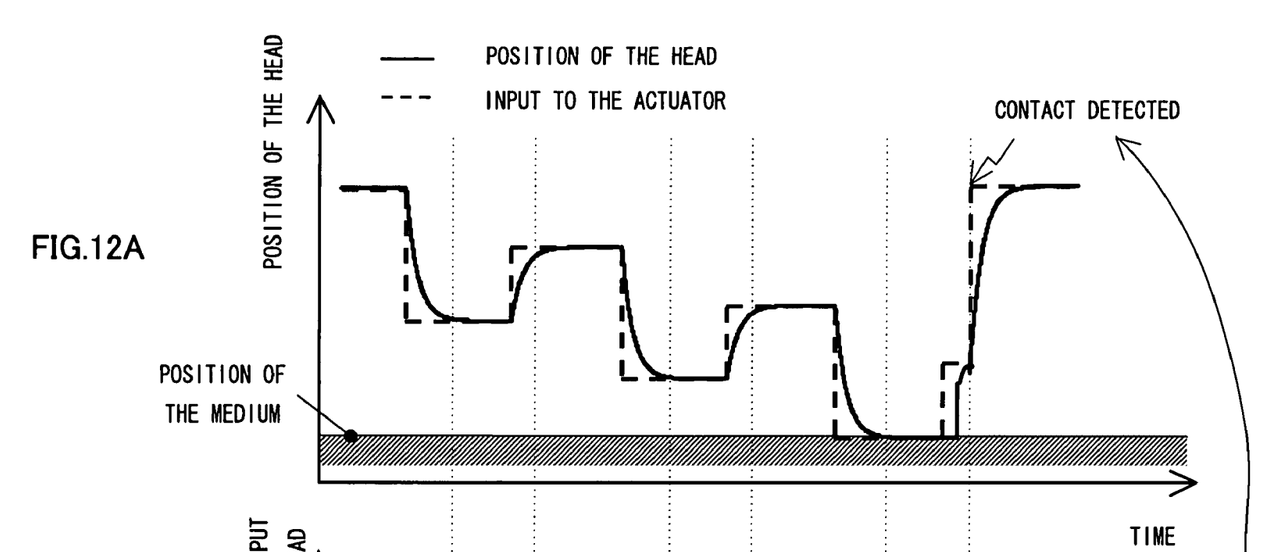
FIGS. 12A and 12B are diagrams explaining how the third embodiment.
Figure 12B:
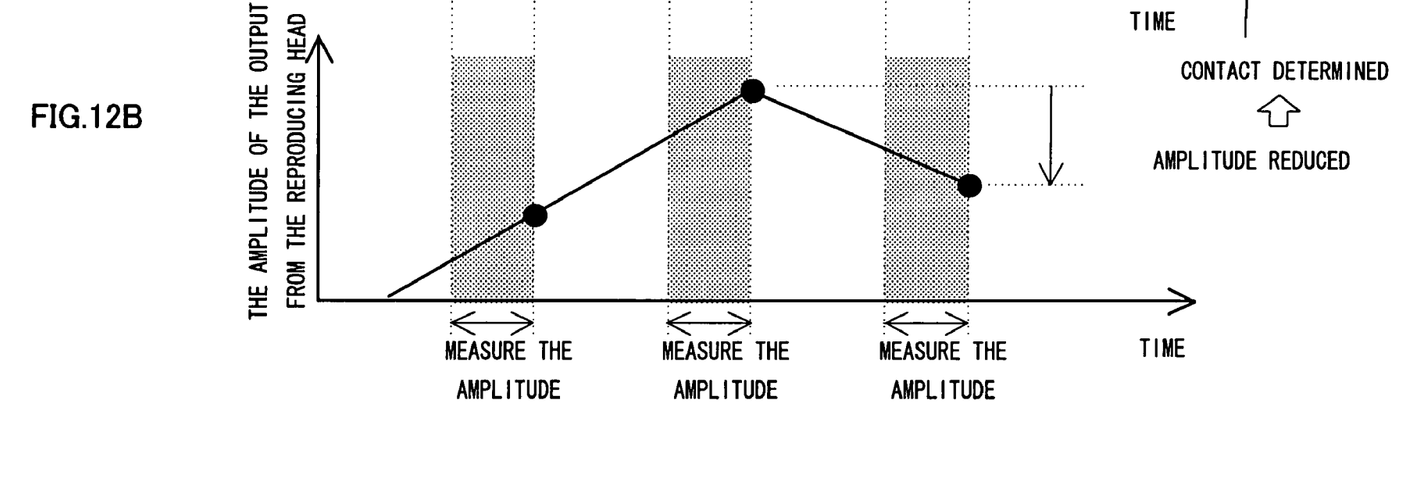

How the third embodiment operates will be explained. As shown in FIG. 12A and 12B, the control unit 6 measures the amplitude of the head output for every cycle of the drive signal, from the reproduced signal supplied from the reproduced-signal-generating unit 8, in order to detect whether the head 2 has contacted the medium. The magnitude of the reproduced signal gradually increases as the distance between the medium and the head decreases before the head contacts the medium. When the head contacts the medium, the slider vibrates, and the output of the read head decreases in terms of amplitude. Upon detecting a decrease in the amplitude of the output of the read head, the control unit 6 determines that the head has contacted the medium.

If the vibration resulting of the contact is extremely small, the output of the head will not decrease. Instead, the output of the head may only stop increasing. In this case, the control unit 6 determines a head-medium contact has taken place, upon detecting that the amplitude of the output has stopped increasing. However, the distance the actuator is driven to cause the contact is the value measured when the amplitude of the output increases last, not the value measured last.

In the third embodiment, the head-medium contact is detected from the reproduced signal output from the head. Namely, the contact can be detected by only the functions that are hitherto inherent to most information-recording/reproducing apparatuses. This can reduce the increase of the manufacturing cost of the apparatus of this invention.

As has been described, the head-medium contact performed to achieve a zero-point detection can be detected in the embodiments of this invention, even if it lasts for the shortest time required. This can prevent, as much as possible, adverse events from resulting from the head-medium contact.

Moreover, the increase in the contact time, due to hysteresis, can be minimized by performing an additional function of moving, for every cycle, the head to the remotest position from the medium.

The embodiments described above are magnetic disk drives that have an actuator for moving the head mounted on the slider in a direction perpendicular to the medium. Hence, it is possible to minimize the probability of adverse events resulting from the head-medium contact, such as errors in recording and/or reproducing information due to the damage to the head and/or the medium, dust making due to the wear of the head and/or medium, and a so-called head crash due to the dust thus made when performing zero-point detection in order to detect the gap between the head and the medium.

What is claimed is:

1. An information-recording/reproducing apparatus that uses a head to record and reproduce information in and from a recording medium, the apparatus comprising:
    a drive unit for each cycle of a plurality of cycles that alternately increases and decreases a gap between the head and the recording medium;
    a signal-detecting unit that detects for each cycle a detection signal from which to determine a contact between the head or a slider supporting the head and the recording medium; and
    a control unit that moves the head to a prescribed position remote from the recording medium and acquires data representing a distance the head has moved to contact the recording medium, when it is determined, from the signal detected by the signal-detecting unit, that the head or the slider has contacted the recording medium.

2. The information-recording/reproducing apparatus according to claim 1, wherein the drive unit drives the head to change cyclically the gap between the head and the recording medium, thereby to reduce the gap between the head and the recording medium during each cycle, and the control unit determines, from the signal detected by the signal-detecting unit, that the head or the slider has contacted the recording medium during each cycle.

3. The information-recording/reproducing apparatus according to claim 1, wherein a minimum gap that exists between the head and the recording medium while the drive unit is alternately increasing and decreasing the gap is maintained all the time the control unit is able to acquire, from the signal-detecting unit, the signal from which to determine a contact between the head or a slider supporting the head and the recording medium.

4. The information-recording/reproducing apparatus according to claim 3, wherein the control unit determines that the head has contacted the recording medium, after the head has been moved from the recording medium, from the signal that the signal-detecting unit detects.

5. The information-recording/reproducing apparatus according to claim 1, wherein the drive unit comprises a heater that causes thermal expansion to drive the head.

6. The information-recording/reproducing apparatus according to claim 1, wherein the drive unit drives the head to maintain a constant maximum gap between the head and the recording medium, while alternately increasing and decreasing the gap between the head and the recording medium, thereby gradually reducing the gap between the head and the recording medium.

7. The information-recording/reproducing apparatus according to claim 1, wherein the drive unit drives the head away from the recording medium by a constant distance, while alternately increasing and decreasing the gap between the head and the recording medium, thereby gradually reducing the gap between the head and the recording medium.

8. The information-recording/reproducing apparatus according to claim 1, wherein the signal-detecting unit detects, as a detection signal, a reproduced signal that the head has acquired from the recording medium, and the control unit determines, from the detection signal, that the head has contacted the recording medium.

9. The information-recording/reproducing apparatus according to claim 1, wherein the signal-detecting unit detects, as a detection signal, a vibration signal representing vibration of the slider supporting the head, and the control unit determines, from the vibration signal, that the head has contacted the recording medium.

10. The information-recording/reproducing apparatus according to claim 9, wherein the signal-detecting unit comprises a piezoelectric element that detects the vibration of the slider supporting the head.

11. The information-recording/reproducing apparatus according to claim 10, wherein the signal-detecting unit comprises a piezoelectric element that detects vibration of a head arm that holds the head slider assembly comprises a head, a slider, and a suspension.

12. A method of detecting a gap between a head and a recording medium in an information-recording/reproducing apparatus that uses the head to record and reproduce information in and from the recording medium, the method comprising:
a driving step for each cycle of a plurality of cycles that alternately increases and decreases the gap between the head and the recording medium;
a detecting step that detects for each cycle a detection signal from which to determine a contact between the head or a slider supporting the head and the recording medium; and
a controlling step that moves the head to a prescribed position remote from the recording medium and acquires data representing a distance the head has moved to contact the recording medium, when it is determined, from the signal detected by the signal-detecting unit, that the head or the slider has contacted the recording medium.

13. The method of detecting a gap between ahead and a recording medium, according to claim 12, wherein in the driving step, the head is driven to change cyclically the gap between the head and the recording medium, thereby to reduce the gap between the head and the recording medium during each cycle, and in the controlling step, it is determined, from the signal detected by the signal-detecting unit, that the head or the slider has contacted the recording medium during the each cycle.

14. The method of detecting a gap between a head and a recording medium, according to claim 12, wherein a minimum gap that exists between the head and the recording medium while the gap is alternately increasing and decreasing in the driving step is maintained all the time the signal from which to determine a contact between the head or a slider supporting the head and the recording medium is able to be acquired in the detecting step.

15. The method of detecting a gap between a head and a recording medium, according to claim 14, wherein in the driving step, the head is driven such that the head is determined to have contacted the recording medium, after the head has been moved from the recording medium, from the signal detected in the detecting step.

16. The method of detecting a gap between a head and a recording medium, according to claim 12, wherein thermal expansion is utilized to drive the head in the driving step.

17. The method of detecting a gap between a head and a recording medium, according to claim 12, wherein in the driving step, the head is driven to maintain a constant maximum gap between the head and the recording medium, while alternately increasing and decreasing the gap between the head and the recording medium, thereby gradually reducing the gap between the head and the recording medium.

18. The method of detecting a gap between a head and a recording medium, according to claim 12, wherein in the driving step, the head is moved away from the recording medium by a constant distance, while alternately increasing and decreasing the gap between the head and the recording medium, thereby gradually reducing the gap between the head and the recording medium.

19. The method of detecting a gap between a head and a recording medium, according to claim 12, wherein in the detecting step, a reproduced signal that the head has acquired from the recording medium is detected as a detection signal, and in the controlling step, it is determined, from the detection signal, that the head has contacted the recording medium.

20. The method of detecting a gap between a head and a recording medium, according to claim 12, wherein in the detecting step, a vibration signal representing vibration of the slider supporting the head is detected as a detection signal, and in the controlling step, it is determined, from the vibration signal, that the head has contacted the recording medium.

* * * * *